United States Patent [19]

Freriks et al.

[11] Patent Number: 6,107,442
[45] Date of Patent: Aug. 22, 2000

[54] OUTDOOR DURABLE COATING COMPOSITIONS AND ACID FUNCTIONAL POLYESTER RESINS AND POLYGLYCIDYL ESTERS THEREOF USABLE THEREFOR

[75] Inventors: Jan Freriks; Ronald Petrus Clemens Van Gaalen; Gregory John Hitchings; Petrus Gerardus Kooijmans, all of Amsterdam, Netherlands

[73] Assignee: Shell Oil Company, Houston, Tex.

[21] Appl. No.: 09/024,756

[22] Filed: Feb. 17, 1998

[30] Foreign Application Priority Data

Feb. 21, 1997 [EP] European Pat. Off. ............. 97200520
Jul. 10, 1997 [EP] European Pat. Off. ............. 97305105

[51] Int. Cl.$^7$ .................................................. C08G 63/02
[52] U.S. Cl. ........................................... 528/272; 428/480
[58] Field of Search .................... 528/176, 272; 428/480

[56] References Cited

U.S. PATENT DOCUMENTS

| | | | |
|---|---|---|---|
| 3,404,018 | 10/1968 | Hicks | 106/252 |
| 3,491,066 | 1/1970 | Petropoulos | 260/75 |
| 3,651,098 | 3/1972 | Heer et al. | 260/348 A |
| 3,749,758 | 7/1973 | Gannon | 260/835 |
| 4,097,466 | 6/1978 | Berger | 260/75 EP |
| 4,997,907 | 3/1991 | Marten et al. | 528/272 |
| 5,096,959 | 3/1992 | Jones et al. | 524/600 |
| 5,138,078 | 8/1992 | Brytus | 549/557 |
| 5,212,213 | 5/1993 | Hutter | 522/81 |
| 5,245,002 | 9/1993 | Kuo | 528/176 |
| 5,439,988 | 8/1995 | Moens et al. | 525/437 |
| 5,480,960 | 1/1996 | Freriks et al. | 528/198 |
| 5,484,842 | 1/1996 | Lewarchik et al. | 524/608 |
| 5,576,397 | 11/1996 | Oberressl et al. | 525/444 |
| 5,739,213 | 4/1998 | Freriks et al. | 525/438 |

FOREIGN PATENT DOCUMENTS

| | | | |
|---|---|---|---|
| 0447360 A2 | 9/1991 | European Pat. Off. | C08G 59/32 |
| 0561102 | 9/1993 | European Pat. Off. | C08G 63/199 |
| 0612779 A2 | 8/1994 | European Pat. Off. | C08G 63/60 |
| 1669725 | 6/1971 | Germany . | |
| 49-128089 | 12/1974 | Japan . | |
| 52-003700 | 1/1977 | Japan | C08G 59/12 |
| 58-189261A | 11/1983 | Japan | C09D 03/64 |
| 60-088079A | 5/1985 | Japan | C08G 59/62 |
| 1048893 | 11/1966 | United Kingdom | C08G 17/14 |
| WO 94/04590 | 3/1994 | WIPO | C08G 59/42 |
| WO 94/05733 | 3/1994 | WIPO | C09D 5/02 |

OTHER PUBLICATIONS

Chemical Abstracts vol. 83, No. 2, 14–7–75, Columbus, Ohio, U.S., Abstract No. 11413, XP002031676.

*Primary Examiner*—Terressa M. Boykin

[57] ABSTRACT

A tertiary carboxyl functional polyester resin useful for production of powder coatings is produced by reacting at least one aliphatic compound comprising two aliphatic hydroxyl groups and a tertiary carboxyl group with at least one cycloaliphatic carboxylic acid compound comprising two secondary aliphatic carboxyl groups or the anhydride thereof, wherein each hydroxyl group independently is a primary or secondary hydroxyl group, and wherein the number of hydroxy groups exceeds the number of carboxylic acid groups and anhydrides thereof. The reaction continues until essentially all the non-tertiary carboxyl groups initially present in the reaction mixture have been reacted. These polyester resins may be used together with a suitable curing agent for the production of powder coatings, or may be converted into the corresponding glycidylesters, which in combination with a suitable curing agent can be used for the production of powder coatings.

15 Claims, No Drawings

OUTDOOR DURABLE COATING COMPOSITIONS AND ACID FUNCTIONAL POLYESTER RESINS AND POLYGLYCIDYL ESTERS THEREOF USABLE THEREFOR

The present invention relates to outdoor durable coating compositions and certain tertiary carboxyl functional polyesters and/or polyglycidyl ester resin derived from said tertiary carboxyl functional polyesters usable therefor, and to a process for the preparation of the resins. More in particular the invention relates to powder coating compositions, and to cured products which have been obtained by using the indicated coating compositions and show improved outdoor properties.

Widely used systems for manufacturing outdoor durable powder coatings are based on mixtures of polyester/triglycidylisocyanurate (TGIC). Coatings made from such mixtures usually show reasonable outdoor durability properties, but further improvement, also from an environmental point of view, is desired. TGIC is relatively toxic (Rat Oral $LD_{50}$ of 0.4 g/kg) and there are indications that the compound is mutagenic according to the Ames Mutagenicity Test.

Other systems which are widely used, especially for automotive topcoats, comprise acrylic resins cross-linked with a melamine formaldehyde resin and/or (blocked or unblocked) isocyanate systems. The curing reaction of such systems, however, is environmentally not very friendly, as (usually) methanol is released. Further, this system does not offer the required level of resistance against acid catalysed hydrolysis, in particular against hydrolysis due to "acid rain", mainly relating to the presence of sulphuric acid in rain. In addition, the resistance against ultraviolet irradiation of this system is usually reasonable, but there are clear possibilities for improvement.

Powder coating compositions based on solid glycidylesters obtained by reaction of 2,2-bis-(4-hydroxyphenyl) propane (bisphenol A) and epichlorohydrin are known. The cured products prepared on the basis of these compositions are resistant against hydrolysis, however, they show a low ultraviolet resistance and are therefore not suitable for applications requiring a high quality outdoor durability such as building parts or automotive topcoats. In this respect reference is made to EP-0720997A, especially FIG. 1, from which it appears that powder coatings based on EPIKOTE (di-glycidyl ether of 2,2-bis-(4-hydroxyphenyl) propane) and a number of commercial polyester/acrylics resins only show moderate weathering resistance.

Other known systems for coating compositions are based on glycidylethers of hydrogenated hydrocarbons, for instance hydrogenated bisphenol A. Due to the absence of an aromatic group, the UV resistance of the hydrogenated compound is better than the non-hydrogenated compound. However, due to the presence of an aliphatic ether group, the outdoor durability is still relatively low, while also the acid resistance is low.

In European patent application No. 0612779A, U.S. Pat. No. 3,749,758, British patent No. 1,048,893 and Japanese patent application No. JP-A-58,189,261 A, tertiary carboxyl functional polyester resins are described. The actually prepared examples, however, are all based on resins comprising aromatic dicarboxylic acids. Thus, as in the case of the resins based on bisphenol A as discussed above, cured products prepared from these polyester resins will show a low ultraviolet resistance and thus are not suitable for high quality outdoor durable applications.

From European patent applications Nos. EP-0634434A and EP-0720997A certain linear tertiary aliphatic carboxyl functional polyesters are known which provide when applied in coating compositions certain progress as to the requirements of outdoor durability (UV stability) and resistance against hydrolysis in the cured state.

It will be appreciated that due to increasing requirements to modern industrially applied coating compositions and more in particular powder coating compositions for economical and/or environmental reasons there is still a strong need for further improvement of said coating compositions, by using alternative and in particular cheaper starting materials, improvement of the curing characteristics, especially lower temperature cure, and under elimination of environmentally undesired solvents as well as improving certain properties of the cured product, especially improved flexibility, weathering resistance and acid resistance and/or by-products.

From the above follows that there is still a need for resin system compositions (cross-linkers and/or epoxy compounds) which are particularly suitable for use in powder coating compositions, which compositions are relatively non toxic as compared to the current polyester/TGIC systems and show excellent outdoor durability in the cured state. These systems should preferably show a relatively low curing temperature and good cured product properties.

It is therefore an object of the invention to provide acid functional polyester resins, preferably linear resins, in which the acid-functionality only comprises tertiary aliphatic carboxylic acid functionality, which can be readily glycidated to form polyglycidylester resins. The tertiary carboxyl functional polyester resins and the polyglycidylester resins are particularly suitable for use in outdoor durable powder coating compositions, which are relatively environmentally friendly and which provide more in particular weathering resistant and acid resistant cured resin matrices. The backbones of the resins according to the present invention do not comprise any ester functions which are susceptible to hydrolysis under relatively mild conditions, and the polyester resins do not comprise any functionalities which are UV-sensitive. The end groups of the resins (i.e. in the backbone) according to the present invention are preferably carboxyl groups, especially secondary groups, but may also be hydroxyl groups, especially secondary groups, or, optionally, esterified hydroxyl groups.

Accordingly, the present invention relates to a tertiary carboxyl functional polyester resin produced by reacting:

a) at least one aliphatic compound A comprising two aliphatic hydroxyl groups which may each independently be a primary or secondary hydroxyl group and a tertiary carboxyl group, b) optionally one or more hydroxyl compounds B, each compound comprising two aliphatic hydroxyl groups which may each independently be a primary or secondary hydroxyl group, c) at least one cycloaliphatic carboxylic acid compound C comprising two secondary aliphatic carboxyl groups or the anhydride thereof, d) optionally one or more dicarboxylic acid compounds D comprising two aliphatic carboxyl groups or the anhydride thereof, and e) optionally either one or more compounds E comprising one primary or secondary hydroxyl group and optionally a tertiary carboxyl group, or one or more monocarboxylic acid compounds G, comprising a primary or secondary carboxyl group, together with equivalent molecular amounts of one or more compounds F selected from the groups defined for A and B, the molar ratio of compounds (A+B):(C+D):E:F:G being (X−1):X:K:L:M, wherein X ranges from 2 to 14, K ranges from 0 to 2 and L ranges from 0 to 2 and M ranges from 0 to the value of L.

Preferably the compounds actually selected as A or B and F are the same, but in principle two or more different representatives of the group defined for A and B can be used actually as compounds A, B and F.

In a process to prepare the hereinbefore specified polyester resins, the reaction is preferably carried out until all, or substantially all, the non-tertiary carboxyl groups as initially present in the reaction mixture have reacted, or until all, or substantially all hydroxyl groups as initially present in the reaction mixture have reacted, depending on the equivalents starting material used. It will be appreciated that instead of the pure (or almost pure) compounds A, B, C, D, E, F and G, also mixtures of two or more compounds A, B, C, D, E, F and G may be used. The compounds A, B, C, D, E, F and G are straight or branched (cyclo)hydrocarbyl compounds and preferably are not substituted by any functional groups, but only comprise hydroxy and/or carboxyl groups. The term "substantially" as used above indicates that at least 92%, preferably at least 95%, more preferably at least 98%, still more preferably at least 99% of the original non-tertiary carboxyl groups or hydroxyl groups have reacted.

The tertiary carboxyl functional polyester resins thus produced are practically free from non-tertiary carboxyl groups or hydroxyl groups when they have an acid value which corresponds to the theoretical value calculated on the basis of the amount of tertiary carboxyl groups of the reactants as initially present in the reaction mixture and the amount of reacting carboxyl and hydroxyl groups. The term "practically" is used herein to indicate a deviation from the theoretical value of +/−8%, preferably 5, more preferably 3%, at most. This is determined by standard alkalimetric titration.

For those skilled in the art it will be understood that the molecular weight distribution and number average molecular weight of the resin produced will depend on the specific reactants and the ratios applied in the process of the invention. Whilst the tertiary aliphatic groups present in compound A and optionally E practically do not react under the esterification conditions employed, glycidation of these tertiary aliphatic carboxyl groups with epihalohydrin can be performed under standard alkaline conditions whereby a polyglycidylester resin can be obtained which contains a low hydrolizable halogen content, usually lower than 0.5% by weight based on the total weight of the composition. Further, as during glycidation hardly any hydrolysis of the resin backbone occurs and thus no low molecular weight products are formed, the polyester resins of the present invention are particularly suitable for the preparation of powder coatings, in view of the absence of relatively low molecular products.

It will be understood that in the esterification reaction the reactivity of primary hydroxyl groups is higher than the reactivity of secondary hydroxyl groups, which in turn are more reactive than tertiary hydroxyl groups. The same order of reactivity holds for carboxyl groups. Acid anhydrides are more reactive than the corresponding (di)acids. Further, substituents at the beta-position of a hydroxyl group or carboxyl group will usually influence the reactivity, and usually will result in a lower reactivity. On the basis of the reactivity orders it will till some extent be possible to predict the most likely chemical structures within the molecular weight distributions of the above described resins. In a preferred embodiment of the invention the order of addition may be chosen in such a way (by first adding one equivalent of anhydride C to two equivalents of dihydroxyl compound A, followed after completion of the reaction by the remainder of the starting compounds included a second batch of A as component F) that the smallest molecule formed will always comprise two molecules of A and three molecules of C, thus having a molecular weight of at least 700. This means that after glycidation even the smallest molecule possible has a relatively high molecular weight, and thus a low toxicity of the product is expected.

The polyester intermediates used in the present invention are preferably linear products, as this will result in the highest Tg temperatures. Therefore, the starting compounds for said polyesters are preferably bi-functional with respect to the groups participating in the formation of the ester functions present in the resin backbone. Thus, the amount of polyfunctional compounds, especially three- and four-functional compounds, is preferably less than 25 mol %, preferably less than 15 mol %, more preferably less than 5 mol % of the total amount of starting materials.

The process which may be used to prepare the polyester resins of the present invention may be carried out according to conventional esterification methods, preferably by azeotropic condensation. In particular, the condensation is carried out by charging the starting compounds to the reactor, followed by reaction at a temperature between 120 and 220° C., and the reaction is continued until the non-tertiary carboxyl groups as initially present in the reaction mixture have disappeared. Usually the reaction is complete in 2 to 12 hours, often between 3 and 8 hours. In the case that compounds E or F and G are intended to be the end groups of the polymer chain, they are preferably added at the end of the reaction, as otherwise the compounds will also be incorporated into the chain. In the case of a monofunctional compounds E, or a pre-condensed monofunctional combination of F and G, it is also possible to add these reactants at the start of the reaction, or during the reaction. In the case that compound F is the same as compound A or B, they may also be added at the start of or during the reaction.

Generally, the azeotropic removal of water is continued until the reaction product is obtained which has an acid value which corresponds to the theoretical value as referred to above. In general the use of one or more esterification catalysts, such as dibutyltinoxide, paratoluenesulphonic acid, tin octoate, zinc octoate and lithium ricinoleate is not required, and preferably no catalyst is used. However, if desired, an esterification catalyst may be used.

The polyester resins of the present invention are suitably derived from compounds A selected from compounds comprising a tertiary aliphatic carboxyl group and two primary hydroxyl groups. Suitable compounds A are alkyl substituted dimethylol acetic acid compounds, the alkyl group being a linear or branched $C_{1-12}$ alkyl group, especially a $C_{1-4}$ alkyl group. A preferred compound A is dimethylolpropionic acid.

The polyester resins of the present invention are suitably derived from compounds B selected from compounds comprising two aliphatic or cycloaliphatic hydroxyl groups. Suitable compounds B for use in the present invention include optionally branched aliphatic or cycloaliphatic compounds. Especially compound B is a straight chain alpha, omega-alkanediol compound optionally substituted by one or more $C_{1-4}$ alkyl groups, a cyclohexyl compound comprising two hydroxy groups attached to the cyclohexyl ring optionally substituted by one or more $C_{1-4}$ alkyl groups, e.g. 1,4-cyclohexanediol, or a perhydro bisphenol compound, e.g. a hydrogenated bisphenol A or F compound. Preferably compound B is a straight chain alpha,omega-alkanediol compound comprising up to 8 carbon atoms optionally substituted by one or more methyl groups or cyclohexanediol optionally substituted by one or more methyl groups.

The polyester resins of the present invention are suitably derived from compounds C selected from compounds comprising two or three, preferably two, secondary carboxylic acid groups, or the anhydrides thereof Suitable compounds C are for example hexahydrophthalic acid (HHPA), methylhexahydrophthalic acid, decahydronaphthalene dicarboxylic acid, endomethylenetetrahydrophthalic acid, methylendomethylene-tetrahydrophthalic acid, 1,4-cyclohexanedicarboxylic acid and 1,3-cyclohexanedicarboxylic acid or the anhydrides thereof, or combinations thereof Preferred compounds C are cycloaliphatic dicarboxylic acids, especially cyclohexane dicarboxylic acid, optionally substituted by one or more methyl groups. HHPA, especially the anhydride being particularly preferred.

The polyester resins of the present invention are suitably derived from a compound D selected from aliphatic dicarboxylic acids or the corresponding anhydrides, especially an alpha,omega alkanedicarboxylic acid optionally substituted by one or more $C_{1-4}$ alkyl groups. Especially D is an alpha,omega alkanedicarboxylic acid comprising between 4 and 14 carbon atoms in the alkane chain, especially between 6 and 10 carbon atoms. Very suitable compounds are suberic acid, azelaic acid, sebacic acid and 1,10 dodecanedicarboxylic acid. Compounds D having an even number of carbon atoms are preferred, as they usually result in higher melting points.

The compound E to be used in the present invention is suitably an aliphatic or cycloaliphatic alcohol, preferably comprising one to ten carbon atoms, optionally substituted by a tertiary carboxyl group. Suitable compounds E are propanol, isopropanol, n-, s-, or i-butanol, amyl alcohol, cyclopentanol, cyclohexanol and hydroxypivalic acid. Compound E is a hydrocarbyl compound which does not comprise any other functional groups or substituents, except one hydroxyl groups and optionally one carboxyl group. Preferably compound E is hydroxypivalic acid.

In an optional combination F+G, to be used in the present invention, the compound F is suitably selected from the same groups of compounds as defined for A and B. A preferred compound F is a cyclohexanediol compound, especially 1,4-cyclohexanediol, or dimethylolpropionic acid.

The compound G to be used in the process of the present invention is suitably a (cyclo)hydrocarbyl group comprising only one carboxylic acid group. Compound G is especially an aliphatic or cycloaliphatic acid, more especially a secondary acid. Preferably compound G is a cycloaliphatic acid, more preferably a secondary cycloaliphatic acid. A preferred compound G is a cycloalkyl carboxylic acid, especially a $C_5$–$C_8$ cycloalkylcarboxylic acid, more preferably cyclohexyl carboxylic acid.

As described above, compounds A, B, C, D, E, F, and G are hydrocarbyl groups comprising one or more hydroxyl and/or carboxyl groups. The compounds may or may not be substituted. The substituents should not deteriorate the outdoor durability of the cured product. Preferably the compounds are not substituted.

It was found that in the formula for the molar ratio of the tertiary carboxyl functional polyesters according to the present invention the value of X is suitably between 3 and 12, preferably between 5 and 10, more preferably between 6 and 9. The value of K is up to 2 and L is up to 2 and preferably K and L have a value 2. The ratio A/(A+B) is suitably at least 0.6, preferably at least 0.75, more preferably at least 0.9, still more preferably is 1. The ratio C/(C+D) is at least 0.6, preferably at least 0.75, more preferably at least 0.9, still more preferably is 1.

According to a preferred embodiment of the polyester resin the molar amount of B is less than the molar amount of C.

The present invention also relates to a process for the preparation of tertiary carboxyl functional polyester resin as defined herein before, by reacting:

a) at least one aliphatic compound A comprising two aliphatic hydroxyl groups which may each independently be a primary or secondary hydroxyl group and a tertiary carboxyl group, b) optionally one or more hydroxyl compounds B, each compound comprising two aliphatic hydroxyl groups which may each independently be a primary or secondary hydroxyl group, c) at least one cycloaliphatic carboxylic acid compound C comprising two secondary aliphatic carboxyl groups or the anhydride thereof, d) optionally one or more dicarboxylic acid compounds D comprising two aliphatic carboxyl groups or the anhydride thereof, and e) optionally either one or more compounds E comprising one primary or secondary hydroxyl group and optionally a tertiary carboxyl group, or one or more monocarboxylic acid compounds G, comprising a primary or secondary carboxyl group, together with equivalent molecular amounts of one or more compounds selected from the groups defined for A and B, the molar ratio of compounds (A+B):(C+D):E:F:G being (X–1):X:K:L:M, wherein X ranges from 2 to 14, K ranges from 0 to 2, L ranges from 0 to 2 and M ranges from 0 to the value of L. The process is preferably carried out at a temperature between 120 to 220° C., preferably 180–200° C., until essentially all the non-tertiary carboxyl groups as initially present in the reaction mixture have reacted.

The tertiary carboxyl functional polyester resins according to the present invention can be converted into polyglycidylester resins which form another aspect of the present invention. Said conversion can be carried out according to glycidation methods known in the art e.g., by reaction with an excess epihalohydrin in the presence of a suitable base and, optionally, a catalyst. Most conveniently epichlorohydrin is used as the epihalohydrin.

European Patent Application No. 0447360 A disclosed glycidylesters which could be used in principle in outdoor durable coatings and in moulding compositions. However, due to the secondary nature of the terminal carboxyl functions present in the carboxylic acid adduct precursors, strong alkaline conditions should be avoided during glycidation of these tricarboxylic acid adducts to avoid hydrolysis of the glycidyl ester formed and/or hydrolysis of one or more ester groups in the resin backbone. As a result thereof the glycidylester produced will contain a relatively high level of hydrolizable chlorine and/or will contain low molecular weight hydrolysis products which might cause toxiticity problems. The high level of hydrolizable chlorine is reflected in example 2 of EP-A-0447360 which relates to the glycidation of the 2:1 adduct of hexahydrophthalic anhydride and dimethylolpropionic acid. The product obtained has a chlorine content of 1.5%. Such a high level of residual chlorine is undesirable in coating compositions. In addition, due to the fact that the glycidylesters reported in EP-A-0447360 are liquid, they cannot be applied in powder coating compositions.

The tertiary carboxyl functional polyester resin and the polyglycidylester resin of the invention have been found to be both suitable for use in powder coating compositions, which in the cured state show improved outdoor durability and in particular improved weathering resistance and acid resistance. Moreover in view of the polymeric nature of the polyglycidylester resin of the invention a lower level of toxicity as compared to TGIC is foreseen and therefore they can advantageously be used as an alternative to TGIC in powder coatings.

The curable powder coating compositions of the invention may be prepared by addition of a cross-linking resin to either the tertiary carboxyl functional polyester resin obtainable by the process of the present invention or to the polyglycidylester resin obtainable by glycidating said tertiary carboxyl functional polyester resin. The amount of cross-linking compound used in the powder coating compositions of the invention will normally be such so as to provide about equal amounts of reactive groups of the cross-linking compound and of the tertiary carboxyl groups present in the linear, tertiary carboxyl functional polyester resin or of the epoxy groups present in the polyglycidylester resin. Curing may be carried out at temperatures between 100 and 240° C., preferably between 120 and 200° C. Curing temperatures are lower than prior art compositions, usually by 20–40° C., while resulting in the same degree of cross-linking. If necessary a catalyst may be used. Suitable curing times are between 5 and 60 minutes, especially between 10 and 30 minutes. Good results are usually obtained by curing at 140–160° C. for 15 minutes.

Suitable cross-linking resins for use in combination with the tertiary carboxyl functional polyester resins of the present invention are, for example, outdoor durable epoxy resins, such as the polyglycidylester resins according to the present invention, the diglycidylesters of alpha, alpha-dibranched dicarboxylic acids as disclosed in European Patent Application publication number 0518,408 A and the polyglycidylesters based on polycarboxylic acids carrying two alkyl substituents on each of the alpha carbon atoms as disclosed in European patent application publication number 0366,205 A.

Suitable cross-linking resins for use in combination with the polyglycidylester resins of the present invention are for example the (corresponding) acid functional polyester resin of the present invention; solid polyacids such a sebacic acid, adipic acid, 1,12-dodecanedioic acid; anhydrides such as polyazeleic polyanhydride and trimellitic anhydride; acid functional polyesters such as the reaction product of about one mole of trimethylolpropane and about 3 moles of hexahydrophthalic anhydride, the reaction product of 1,6-hexanediol with a molar excess of 1,12-dodecanedioic acid, the reaction product of about 4 moles 1,10-decanedicarboxylic acid, about 1.49 moles hexanediol, about 0.47 moles 1,1,1-tris-(hydroxymethyl)-propane and about 0.27 moles pentaerythritol, the reaction product of about 4 moles 1,10-decanedicarboxylic acid, about 1.2 moles hexanediol, about 0.45 moles trimethylolpropane, about 0.29 moles pentaerythritol and about 0.21 moles dimethylolpropionic acid and the reaction product of about one mole of hexamethoxymethylmelamine and about 3 moles of hydroxypivalic acid; cyanuric acid; and solid basic curing agents such as dicyandiamide and $BF_3$-complexes. Preferred curing agents are the acidic polyesters of the present invention and the reaction product of about one mole of trimethylolpropane and about 3 moles of hexahydrophthalic anhydride.

The powder coating compositions of the present invention may further comprise a catalyst and optionally other additives, as known in the art to be suitable for use in powder coating compositions.

Suitable catalyst are for example quaternary ammonium and phosphonium salts; metal salts/compounds such as for example stannous(II)octoate; basic compounds such as for example the imidazoles; and tertiary amines such as for example 1,8-diazabicycloundecene.

The amount of catalyst used will usually somewhere in the range of from 0.1 to 2% by weight based on the weight of the total powder coating composition.

The invention is illustrated by the following examples, however without restricting its scope to these specific embodiments.

EXAMPLE 1

Hexahydrophthalic acid anhydride (9 moles), dimethylolpropionic acid (8 moles) and hydroxy pivalic acid (2 moles) were charged to a round bottom glass reactor, equipped with a mechanical stirrer, temperature control, nitrogen inlet and vacuum facilities. The mixture was stirred under nitrogen and heated to 150° C. A vacuum of 950 mbar was applied. The temperature of the reaction mixture was increased in one hour to 200° C. and kept at 200° C. until the theoretical acid value was reached. The acid functional polyester was discharged and allowed to cool to room temperature. Acid value: 3.94 meq/g; mol. weight: 2535; m.p. 80–110° C.

EXAMPLE 2

Hexahydrophthalic acid anhydride (7 moles), dimethylolpropionic acid (8 moles) and dodecane dicarboxylic acid (2 moles) were charged to a round bottom glass reactor, equipped with a mechanical stirrer, temperature control, nitrogen inlet and vacuum facilities. The mixture was stirred under nitrogen and heated to 150° C. A vacuum of 950 mbar was applied. The temperature of the reaction mixture was increased in one hour to 200° C. and kept at 200° C. until the theoretical acid value was reached. The acid functional polyester was discharged and allowed to cool to room temperature. Acid value: 4.08 meq/g; mol. weight: 2451; m.p. 60–75° C.

EXAMPLE 3

An acid functional polyester was prepared from hexahydrophthalic acid anhydride (5 moles), dimethylol propionic acid (4 moles) and hydroxy pivalic acid (2 moles) in the way as described in example 1. Product: acid value 4.13; weight 1453; m.p. 70–85° C.

EXAMPLE 4

The corresponding glycidylester was prepared from a functional polyester derived from hydrogenated diphenylol propane (6 moles), hexahydrophthalic anhydride (9 moles), dimethylol propionic acid (2 moles) and hydroxy pivalic acid (2 moles) in the way as described in example 2 of EP-0634434A (acid-functional polyester resin 1). Precursor: acid value 1.20; mol. weight 3340; m.p. 115–125° C.; product: EGC 1120 mmol/kg; m.p. 85–90° C.

EXAMPLE 5

The corresponding glycidylester was prepared from a functional polyester derived from hydrogenated diphenylol propane (3 moles) hexahydrophthalic anhydride (9 moles), dimethylol propionic acid (5 moles) and hydroxy pivalic acid (2 moles) in the way as described in example 2 of EP-0634434A. Precursor: acid value 2.38; weight 2937; m.p. 99–120° C.; product: EGC 1.79; m.p. <50° C.

EXAMPLE 6

The corresponding glycidyl ester was prepared from a functional polyester, derived from hydrogenated diphenylol propane (3 moles), hexahydrophthalic anhydride (6 moles), dimethylol propionic acid (2 moles) and hydroxy pivalic acid (2 moles) in the way as described in example 2 of EP-0634434A. Precursor: acid value 1.82; weight 2198; m.p. 105–115° C.; product: EGC 1.40; m.p. <50° C.

EXAMPLE 7

The corresponding glycidylester was prepared from a functional polyester, which had been earlier prepared from hydrogenated diphenylolpropane (6 moles), hexahydrophthalic acid anhydride (9 moles) and dimethylol propionic acid (4 moles) in the way as described in example 3 of EP-0720997A. Precursor: acid value 1.19; mol. weight 3372; product: EGC 1170 mmol/kg; m.p. 80–90° C.

EXAMPLE 8

An acid functional polyester was made in the way as described in Example 1 using as starting material hydrogenated diphenylolpropane (4 moles), hexahydrophthalic acid anhydride (9 moles), dimethylol propionic acid (4 moles) and para-t-butylcylohexanol (2 moles). Product properties: acid value 1.32 mmol/kg; mol. weight 3036; m.p. 105–120° C. The acid functional polyester was converted into the glycidyl ester by dissolving 1 carboxyl equivalent polyester in 8 moles epichlorohydrin and isopropylalcohol (same volume as ECH). The solution was charged to a glass reactor equipped with temperature control, stirrer and reflux condenser. The temperature was then gradually increased to 70° C., followed by the gradual addition of an aqueous solution of 1.05 moles NaOH over a period of 60 minutes. After a post reaction time of 10 minutes the reactor content was allowed to settle and the aqueous phase was separated from the organic phase, followed by several washings steps with water. Product properties: EGC 1230 mmol/kg; m.p. 75–85° C.

EXAMPLE 9

An epoxy functional polymer was prepared by reaction of the vinyl ester of a C10 Koch acid (Veova-10, is a trademark)(22 parts by weight), dimethylmaleonate (6.5 pbw), styrene (43.0 pbw), methylmethacrylate (11.5 pbw), glycidylmethacrylate (17.0 pbw) and di-tert-butyl peroxide (2 pbw). The vinyl ester of the Koch acid and dimethylmaleonate are charged to a glass reactor equipped with a mechanical stirrer, temperature control, nitrogen inlet, inlet tube for monomers and reflux condenser with direct reflow into the reactor. The reactor is heated to 155–170° C. The remaining monomers and the initiator are added to the reactor at a constant rate in 5 hours, followed by two additional hours at 170° C. Then the polymer is dumped and cooled. Product properties: EGC 1100 mmol/kg; Tg 312 K; Mn (GPC) 7.0*108, Mw (GPC) 30.2*108.

EXAMPLE 10

Coating compositions were made in the same way as described in EP-0720997A, Example 4.

TABLE

| Coating composition | | | | | | | | | | |
|---|---|---|---|---|---|---|---|---|---|---|
| Acidic polyester | Ex.1 | Ex.1 | Ex.1 | Ex.1 | Ex.2 | Ex.2 | Ex.3 | Ex.3 | | |
| Epoxy coreactant | Ex.4 | Ex.7 | Ex.8 | Ex.9 | Ex.4 | Ex.8 | Ex.5 | Ex.6 | | |
| Comparison examples | | | | | | | | | Polyester/ TGIC | Acrylate/ IC, MF |
| Cure temperature [° C.] | 200 | 200 | 200 | 200 | 200 | 200 | 160 | 160 | 180 | 160 |
| Coating properties König hardness[a] [s] | 220 | 200 | 210 | 200 | 200 | 200 | 190 | 190 | 210 | 170 |
| Conical Mandrell[b] | Fail | Pass | Pass | Fail | Pass | Pass | Pass | Pass | Pass | Fail |
| GardnerImpact[c] [inch.lb] | <20 | <20 | <20 | <20 | <20 | <20 | P20 | P20 | P40 | <20 |
| Acid resistance[d] | 5 | 4–5 | 4–5 | 3–4 | 3–4 | 3–4 | 4 | 4 | 3 | 1–2 |
| Weathering[e] [*100 h] | >35 | >25 | >35 | 25 | >30 | >30 | 30 | 35 | 5 | 25 |

[a]Performed on an Erichsen type 299/300
[b]Performed on an Erichsen type 312
[c]Performed on an Erichsen type 304
[d]Test performed: Putting droplets of 0.6 N $H_2SO_4$ on the coatings and storing them uncovered in an oven at 50° C. for 90 minutes. The performance was assessed visually using a rating from 1–5(1 = coating completely dissolved, 5 = coating unattacked).
[e]Exposure time in Weather-Ometer to 50% reduction in gloss. Test performed: SAE J1960-1989.

The TGIC based comparison example is based on the cured reaction product of TGIC with an equivalent amount of a commercial acid functional polyacrylate resin (URALAC 4200, DSM, based on terephthalic acid and glycol).

The acrylate based comparison example is based on glycidyl methacrylate (ex UCB) cross-linked with dodecane carboxylic acid (Synthacryl, Hoechst, acid value 300 mg KOH, M 2000, m.p. 80–90° C.) and an equivalent amount of melamine (MF).

The MEK resistance is measured by the number of double rubs with a MEK impregnated sample until the coating is damaged and the panel is visible.

The hardness is measured according to the pendulum damping test (König hardness) according to ISO 1522-1973.

The weathering resistance is measured according to the standard of the Society of Automotive Engineers (SAE J1960-1989). The test method is designed to accelerate extreme environmental conditions outside a vehicle due to sunlight, heat and moisture (humidity, condensation or rain).

Use is made of an Atlas C165 Xenon Arc Weather-O-meter until a 50 percent gloss reduction is obtained.

The acid resistance is measured by applying a droplet of 0.6 N $H_2SO_4$ on the coating at 50° C. for 90 minutes. The results are described on a scale of 1 to 5: 1-dissolved, 2-softening, 3-whitening, 4-traces, 5-no damage.

We claim:

1. A tertiary carboxyl functional polyester resin produced by reacting:
   a) at least one aliphatic compound A comprising two aliphatic hydroxyl groups which may each independently be a primary or secondary hydroxyl group and a tertiary carboxyl group,
   b) optionally one or more hydroxyl compounds B, each compound comprising two aliphatic hydroxyl groups which may each independently be a primary or secondary hydroxyl group,
   c) at least one cycloaliphatic carboxylic acid compound C comprising two secondary aliphatic carboxyl groups or the anhydride thereof,
   d) optionally one or more dicarboxylic acid compounds D comprising two aliphatic carboxyl groups or the anhydride thereof, and
   e) optionally either one or more compounds E comprising one primary or secondary hydroxyl group and optionally a tertiary carboxyl group, or one or more monocarboxylic acid compounds (G) comprising a primary or secondary carboxyl group, together with equivalent molecular amounts of one or more compounds (F) selected from the groups for A and B,
   the molar ratio of compounds (A+B):(C+D):E:F:G being (X−1):X:K:L:M, wherein X ranges from 2 to 14, K ranges from 0 to 2, L ranges from 0 to 2 and M ranges from 0 to the value of L.

2. The tertiary carboxyl functional polyester of claim 1 wherein the compounds A or B and F are the same.

3. The tertiary carboxyl functional polyester resin of claim 1 wherein compound A is dimethylolpropionic acid.

4. The tertiary carboxyl functional polyester resin of claim 1 wherein compound B is a straight chain alpha,omega-alkanediol compound comprising up to 8 carbon atoms optionally substituted by one or more methyl groups or cyclohexanediol optionally substituted by one or more methyl groups.

5. The tertiary carboxyl functional polyester resin of claim 1 wherein compound C is hexahydrophthalic acid.

6. The tertiary carboxyl functional polyester resin of claim 1 wherein compound D is an alpha,omega alkanedicarboxylic acid comprising between 4 and 14 carbon atoms in the alkane chain.

7. The tertiary carboxyl functional polyester resin of claim 1 wherein compound E is hydroxypivalic acid.

8. The tertiary carboxyl functional polyester resin of claim 1 wherein compound F is dimethylolpropionic acid and compound G is a $C_5$–$C_8$ cycloalkylcarboxylic acid.

9. The tertiary carboxyl functional polyester resin of claim 1 wherein X is 6 to 9.

10. The tertiary carboxyl functional polyester resin of claim 1 wherein the ratio A/(A+B) is at least 0.6, and the ratio C/(C+D) is at least 0.6.

11. A polyglycidylester resin produced by glycidating the tertiary carboxyl functional polyester resin of claim 1.

12. A powder coating composition comprising a polyglycidylester resin of claim 11 and a cross-linking agent.

13. A product coated with the powder coating compositions of claim 12.

14. A weathering resistant and acid resistant cured resin matrix produced by curing a powder coating composition of claim 12.

15. A shaped article coated with the weathering resistant and acid resistant cured resin matrix of claim 14.

* * * * *